(12) United States Patent
Yoon et al.

(10) Patent No.: US 10,862,080 B2
(45) Date of Patent: Dec. 8, 2020

(54) BATTERY AND ELECTRONIC DEVICE INCLUDING THE SAME

(71) Applicant: Samsung Electronics Co., Ltd., Gyeonggi-do (KR)

(72) Inventors: Jong Moon Yoon, Gyeonggi-do (KR); June Young Hur, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 16/170,241

(22) Filed: Oct. 25, 2018

(65) Prior Publication Data
US 2019/0131594 A1    May 2, 2019

(30) Foreign Application Priority Data

Oct. 26, 2017  (KR) .......................... 10-2017-0140171

(51) Int. Cl.
*H01M 2/02*    (2006.01)
*H01M 2/04*    (2006.01)
(Continued)

(52) U.S. Cl.
CPC ........ *H01M 2/0404* (2013.01); *G06F 1/1626* (2013.01); *G06F 1/1635* (2013.01); *H01M 2/0275* (2013.01); *H01M 2/0482* (2013.01); *H01M 2/26* (2013.01); *H01M 2/361* (2013.01); *B60K 6/28* (2013.01); *B60L 50/64* (2019.02);
(Continued)

(58) Field of Classification Search
CPC ............. H01M 2/0404; H01M 2/0275; H01M 2/0482; H01M 2/26; H01M 2/361
See application file for complete search history.

(56) References Cited

U.S. PATENT DOCUMENTS 8,334,068 B2    12/2012    Takeuchi et al.
8,920,968 B2    12/2014    Noda et al.
(Continued)

FOREIGN PATENT DOCUMENTS

EP    1744384 A1    1/2007
EP    2375472 A1    10/2011
(Continued)

OTHER PUBLICATIONS

International Search Report dated Mar. 29, 2019.
European Search Report dated Oct. 15, 2020.

*Primary Examiner* — Jane J Rhee
(74) *Attorney, Agent, or Firm* — Cha & Reiter, LLC

(57) ABSTRACT

A battery includes an electrode assembly including a positive electrode sheet, a separation membrane, and a negative electrode sheet, at least one cover member surrounding at least a part of an outermost region of the electrode assembly, and exterior material accommodating the electrode assembly and the at least one cover member. The at least one cover member has at least a partial area that overlaps and is fixed to the exterior material, and includes a plurality of air gaps permitting impregnation of the electrode assembly by an electrolyte. An electronic device includes a housing, a display accommodated in the housing and having at least part exposed outside the housing, a memory disposed in the housing, a battery accommodated in the housing, and a processor electrically connected to the display, the memory, and the battery. Other various embodiments as understood from the specification are possible.

18 Claims, 10 Drawing Sheets

(51) Int. Cl.
    *H01M 2/26*     (2006.01)
    *H01M 2/36*     (2006.01)
    *G06F 1/16*     (2006.01)
    *B60K 6/28*     (2007.10)
    *B60L 50/64*     (2019.01)

(52) U.S. Cl.
    CPC ....... *B60Y 2200/91* (2013.01); *B60Y 2200/92* (2013.01)

(56) References Cited

U.S. PATENT DOCUMENTS

| | | |
|---|---|---|
| 8,980,464 B2 | 3/2015 | Kim et al. |
| 9,023,509 B2 | 5/2015 | Cho et al. |
| 9,865,848 B2 | 1/2018 | Kim et al. |
| 10,276,887 B2 | 4/2019 | Kim et al. |
| 2007/0231685 A1 | 10/2007 | Takeuchi et al. |
| 2011/0003198 A1 | 1/2011 | Noda et al. |
| 2011/0244318 A1 | 10/2011 | Cho et al. |
| 2012/0115025 A1 | 5/2012 | Kim et al. |
| 2015/0072179 A1 | 3/2015 | Itabashi |
| 2015/0147640 A1 | 5/2015 | Kim et al. |
| 2016/0308241 A1 | 10/2016 | Kim et al. |
| 2017/0125851 A1 | 5/2017 | Park |

FOREIGN PATENT DOCUMENTS

| | | |
|---|---|---|
| JP | 10-241744 A | 9/1998 |
| JP | 2009-181898 A | 8/2009 |
| KR | 10-2014-0032712 A | 3/2014 |
| KR | 10-2015-0082118 A | 7/2015 |
| KR | 10-2015-0115435 A | 10/2015 |
| KR | 10-2017-0049276 A | 5/2017 |

BATTERY AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2017-0140171, filed on Oct. 26, 2017, in the Korean Intellectual Property Office, the disclosure of which is incorporated by reference herein its entirety.

BACKGROUND

1. Field

The present disclosure relates to a battery and an electronic device having the battery mounted therein.

2. Description of Related Art

Electronic devices are becoming increasingly smaller and lighter in weight, providing more convenient functionalities, and are even becoming aesthetically pleasing. Accordingly, components in the electronic devices have to be mounted in increasingly smaller and narrower spaces in the electronic devices. For instance, recent electronic devices have embedded batteries that enables simpler design.

The above information is presented as background information only to assist with an understanding of the present disclosure. No determination has been made, and no assertion is made, as to whether any of the above might be applicable as prior art with regard to the present disclosure.

SUMMARY

In the manufacturing process of an embedded battery, an inner electrode assembly (often referred to as a "jelly roll") may have a dimensional tolerance, or the electrode assembly and exterior material (often referred to as a "pouch") may have an assembly tolerance therebetween. The tolerances may cause movement of the electrode assembly within the exterior material during external shocks. The movement may cause stress on the embedded battery, leading to damage of the embedded battery. Preventing the movement of the electrode assembly using a separate adhesive member (e.g., a tape) may reduce impregnation of the electrode assembly by an electrolyte, especially where the electrode assembly uses polyethylene terephthalate (PET).

Aspects of the present disclosure may address at least the above-mentioned problems and/or disadvantages and may provide at least the advantages described below. Accordingly, an aspect of the present disclosure may provide a battery for suppressing a movement of an electrode assembly or relative motion of the electrode assembly and an exterior material, based on a cover member surrounding at least a partial area of the electrode assembly, and an electronic device including the battery.

A battery includes an electrode assembly including a positive electrode sheet, a separation membrane, and a negative electrode sheet, at least one cover member surrounding at least a part of an outermost region of the electrode assembly, and exterior material accommodating the electrode assembly and the at least one cover member. The at least one cover member has at least a partial area that overlaps and is fixed to the exterior material, and includes a plurality of air gaps permitting impregnation of the electrode assembly by an electrolyte. The at least one cover member has at least a partial area that overlaps and is fixed to the exterior material, and includes a plurality of air gaps permitting impregnation of the electrode assembly by an electrolyte.

In accordance with another aspect of the present disclosure, an electronic device includes a housing, a display accommodated in the housing and having at least part exposed outside the housing, a memory disposed in the housing, a battery accommodated in the housing, and a processor electrically connected to the display, the memory, and the battery.

The battery included in the electronic device includes an electrode assembly including a positive electrode sheet, a separation membrane, and a negative electrode sheet, at least one cover member surrounding at least a part of an outermost region of the electrode assembly, and exterior material accommodating the electrode assembly and the at least one cover member. The at least one cover member has at least a partial area that overlaps and is fixed to the exterior material, and includes a plurality of air gaps permitting impregnation of the electrode assembly by an electrolyte. The at least one cover member has at least a partial area that overlaps and is fixed to the exterior material, and includes a plurality of air gaps permitting impregnation of the electrode assembly by an electrolyte.

According to various embodiments, physical or functional damage of the battery due to external shocks might be prevented, possibly preventing accidents such as electrolyte leakage, electric leakage, ignition, explosion, or the like. This may improve stability in operation of the battery or the electronic device.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
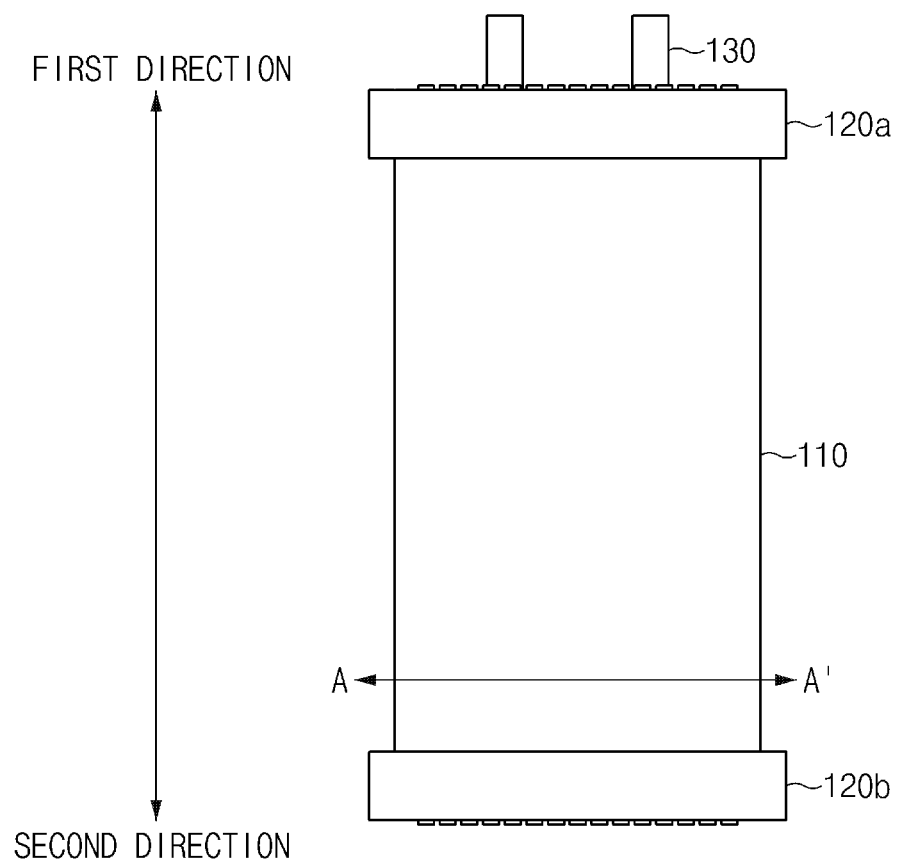
FIG. 1 is a view illustrating an electrode assembly according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 is a view illustrating an electrode assembly 110 according to an embodiment.

Referring to FIG. 1, at least one cover member 120a and/or 120b may be coupled to the electrode assembly 110 included in a battery according to an embodiment. In certain embodiments, the electrode assembly 110 can be an elongated oval in shape. The at least one cover member 120a and/or 120b may be formed of a specific material (e.g., polypropylene) and may surround part of the outermost region of the electrode assembly 110. In certain embodiments, the at least one cover member 120a and/or 120b may be shaped to define an opening that is the shape of the electrode assembly 110.

For example, the at least one cover member 120a and/or 120b may be coupled to a distal end of the electrode assembly 110 in a first direction and/or a distal end of the electrode assembly 110 in a second direction. The remaining region of the electrode assembly 110 (the region that is not surrounded by the at least one cover member 120a and/or 120b) may permit a volume change (e.g., from swelling) due to, for example, abnormal operation of the battery or the ending of the remaining lifetime of the battery. According to an embodiment, based on the at least one cover member 120a and/or 120b surrounding the part of the outermost region of the electrode assembly 110, the structure (commonly referred to as a "jelly roll") of the electrode assembly 110 may be fixed, or movement of components (e.g., a positive electrode sheet, a negative electrode sheet, and a separation membrane) of the electrode assembly 110 during external mechanical jolts may be suppressed. In various embodiments, an additional cover member 120 may be coupled to the electrode assembly 110, for improving functional efficiency (e.g., fixing the electrode assembly 110 or suppressing a movement of the electrode assembly 110) by the at least one cover member 120a and/or 120b. Accordingly, while two cover members 120a and 120b are shown, it is noted that any number of additional cover members 120 can be used.

In an embodiment, an electrode tab 130 may extend from a region of the positive electrode sheet and another electrode tab 130 may extend from a region of the negative electrode sheet that constitute the electrode assembly 110, and at least a partial area of each electrode tab 130 may be connected to an electrode lead of a conductive material. The electrode lead may support an electrical connection with another battery or an external device.

Figure 2A:
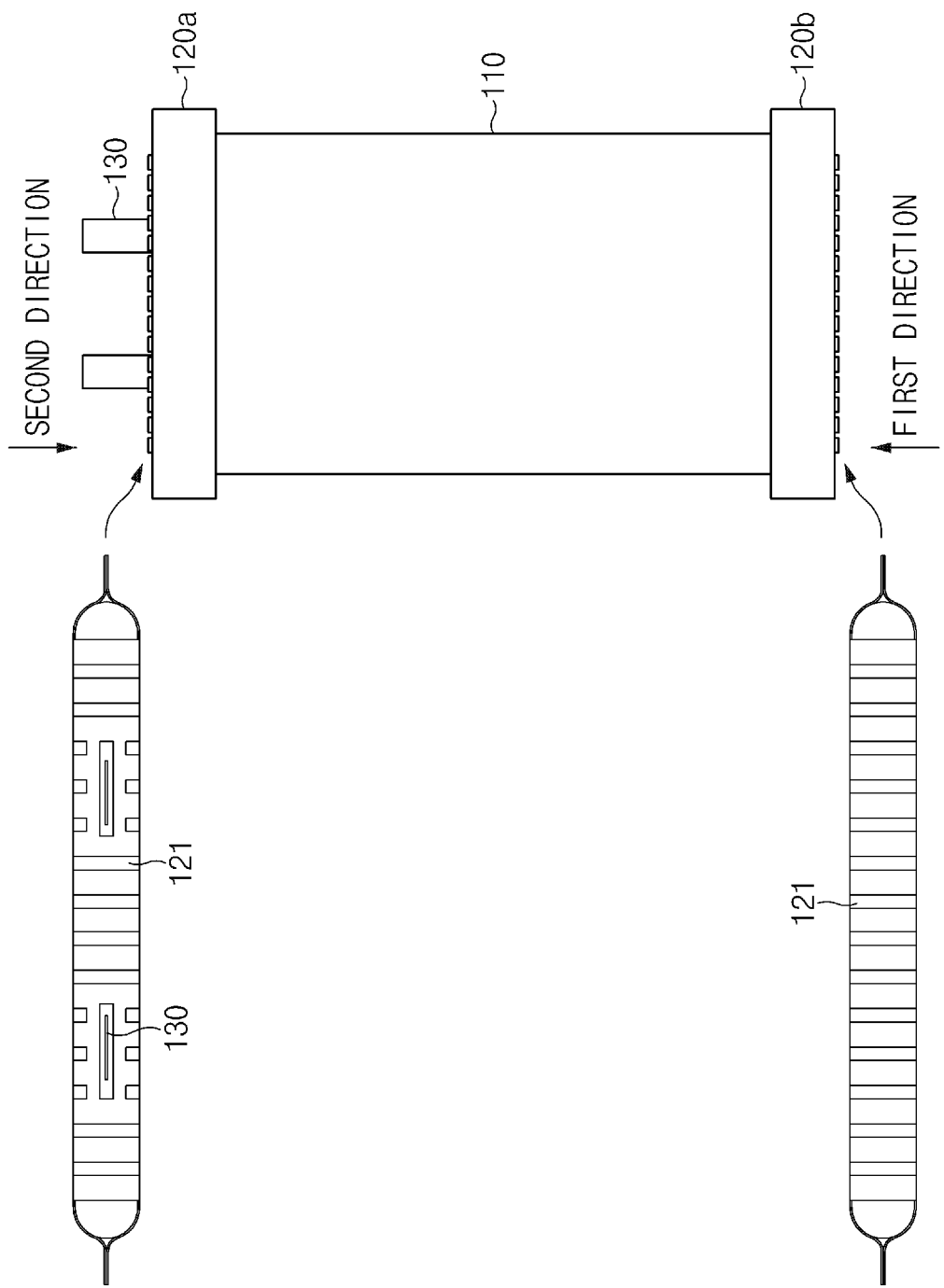
FIG. 2A is a view illustrating an air gap pattern of a cover member according to an embodiment.
Figure 2B:
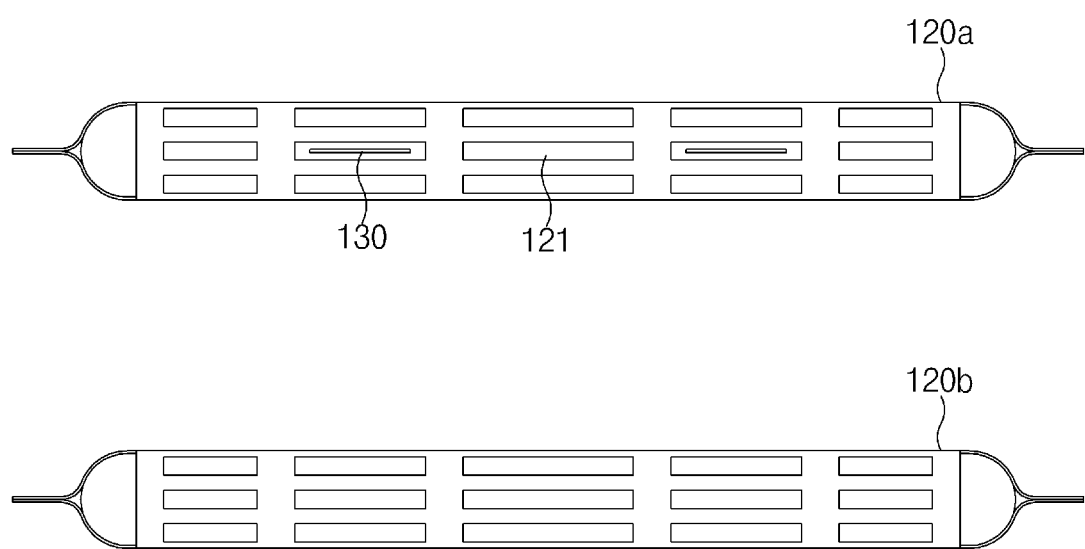
FIG. 2B is a view illustrating an air gap pattern of the cover member according to another embodiment.
Figure 2C:
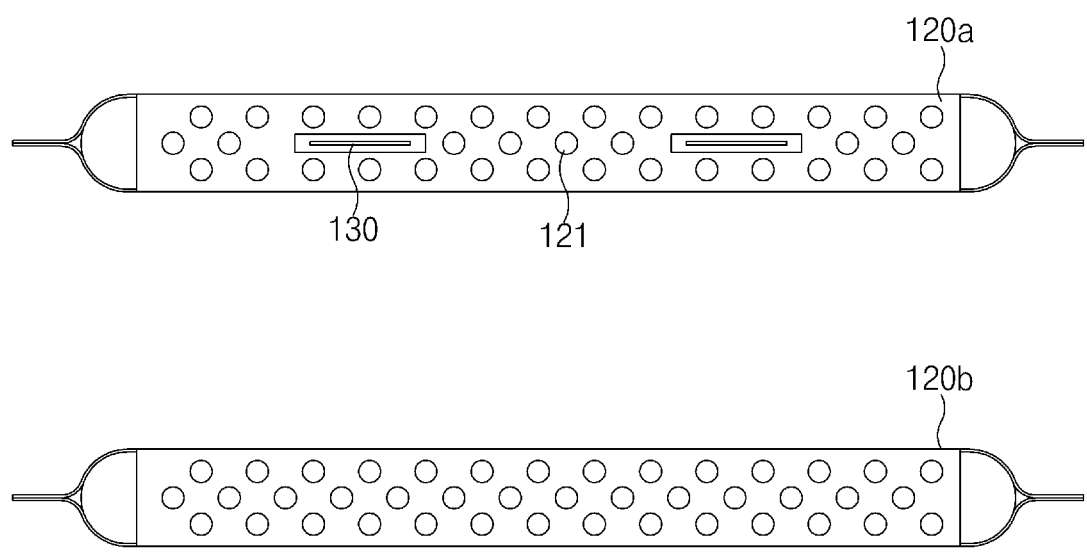
FIG. 2C is a view illustrating an air gap pattern of the cover member according to another embodiment.

FIGS. 2A, 2B, and 2C are top and bottom views illustrating air gap patterns of the cover member according to various embodiments.

Referring to FIGS. 2A, 2B, and 2C, a plurality of air gaps 121 may be formed in a region of the at least one cover member 120a and/or 120b that surrounds at least a partial area of the electrode assembly 110. For example, the plurality of air gaps 121 may be formed through a section of the at least one cover member 120a and/or 120b in the first direction and/or a section of the at least one cover member 120a and/or 120b in the second direction. When the electrode assembly 110 is accommodated in an exterior material 140 (see FIG. 4) which will be described below, the plurality of air gaps 121 may support easy impregnation of the electrode assembly 110 inside the exterior material 140 by an electrolyte.

In an embodiment, the plurality of air gaps 121 may be formed in a specified pattern in the manufacturing process (e.g., injection molding) of the cover member 120a and/or 120b. For example, the plurality of air gaps 121 may be formed in a longitudinal pattern, a lateral pattern, or a grid pattern in which the plurality of air gaps 121 are regularly arranged with a specified interval therebetween.

Alternatively, the plurality of air gaps 121 may be formed in a pattern in which the plurality of air gaps 121 are alternately repeated in a longitudinal or lateral direction, or may be formed in a pattern in which the plurality of air gaps 121 are irregularly arranged. In an embodiment, at least some of the plurality of air gaps 121 included in the first cover member 120a may be formed in regions corresponding to the electrode tabs 130 protruding from the electrode assembly 110. Alternatively, the plurality of air gaps 121 included in the first cover member 120a may be formed to avoid the regions from which the electrode tabs 130 (or the electrode leads connected to the electrode tabs 130) protrude. According to various embodiments, the pattern of the plurality of air gaps 121 is not limited to the above-described patterns, and the plurality of air gaps 121 may be formed in various patterns that support impregnation of an electrolyte into the electrode assembly 110.

Figure 3:
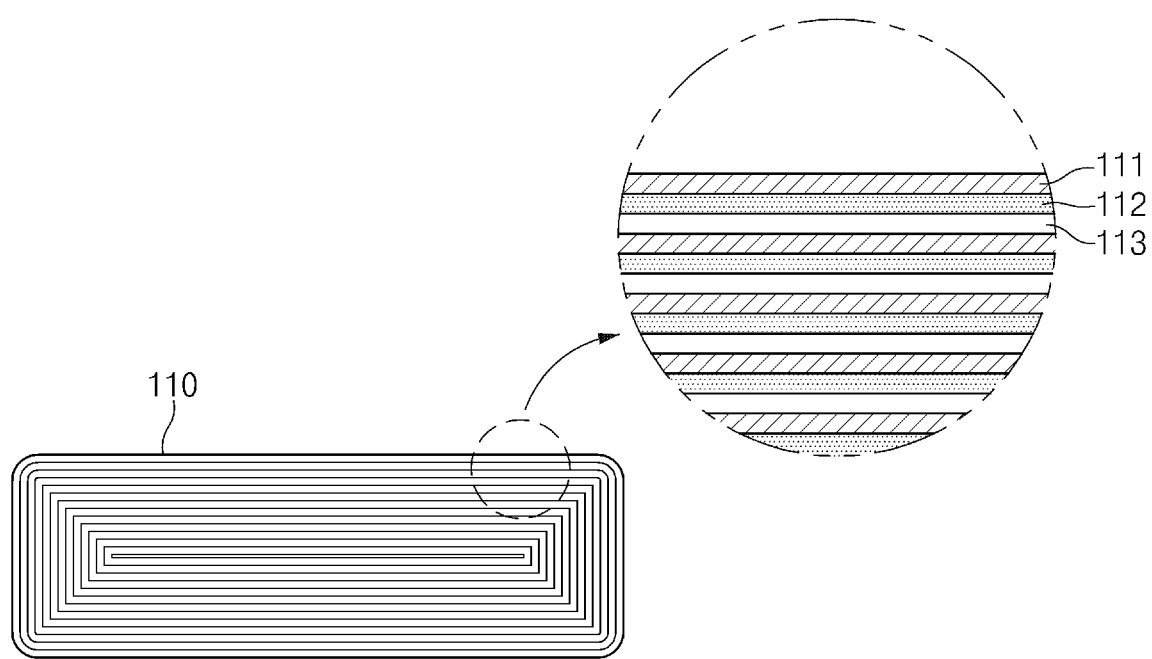
FIG. 3 is a cross-sectional view illustrating the electrode assembly according to the embodiment.

FIG. 3 is a cross-sectional view illustrating the electrode assembly 110 according to the embodiment. FIG. 3 is a cross-sectional view taken along line A-A' of FIG. 1.

Referring to FIG. 3, the electrode assembly 110 may include a jelly-roll type electrode assembly 110 in which a laminated structure of a positive electrode sheet 111, a separation membrane 112 (or a separator), and a negative electrode sheet 113 is spirally wound. The positive electrode sheet 111 or the negative electrode sheet 113 may be formed by applying a slurry including an active material (e.g., lithium metal oxide, carbon, a carbon composite, or the like) to a current collector, drying the slurry, rolling, pressing, and cutting.

In an embodiment, the jelly-roll type electrode assembly 110 may be formed by winding the laminated structure of the positive electrode sheet 111, the negative electrode sheet 113, and the insulating separation membrane 112 therebetween (e.g., polyethylene, polypropylene, a composite of polyethylene and polypropylene, or the like) and then pressing the laminated structure into a predetermined shape (e.g., a shape corresponding to the exterior material 400 (see FIG. 4) which will be described below). Winding causes a disparity in lengths between the inner side of the winding and the outer side of the winding. This disparity can urge a wound structure to straighten or unwind. In the case of a jelly-role type electrode assembly 110, the outermost winding may be urged to straighten and unwind. According to an embodiment, part of the outermost region of the jelly-roll type electrode assembly 110 may be surrounded by the above-described cover member 120 (see FIG. 1). Accordingly, the winding structure of the outermost electrode sheet of the jelly-roll type electrode assembly 110 may be firmly fixed, or the outermost electrode sheet may be prevented from unwinding or straightening and separating from the winding structure.

Figure 4:
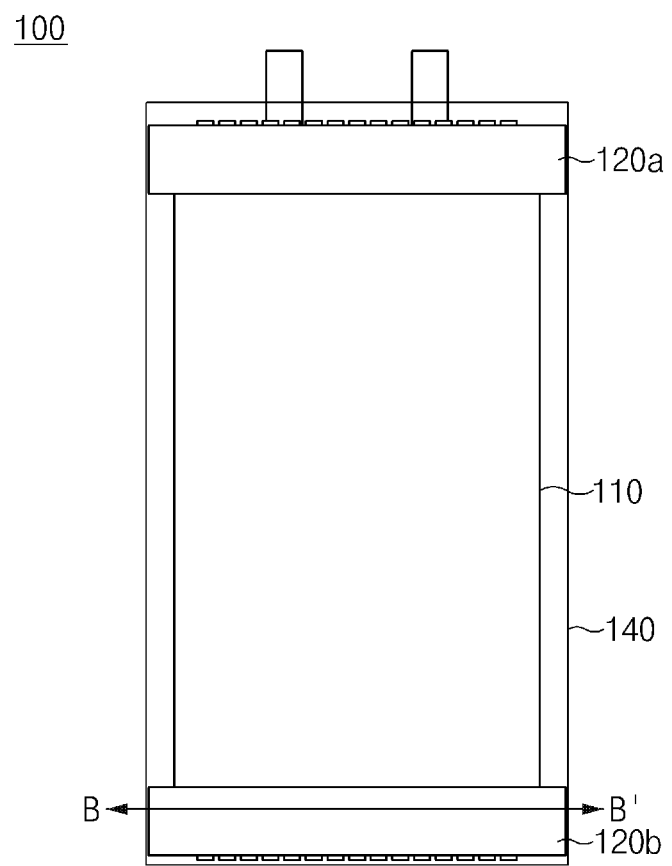
FIG. 4 is a view illustrating the electrode assembly accommodated in an exterior material according to an embodiment.
Figure 5:
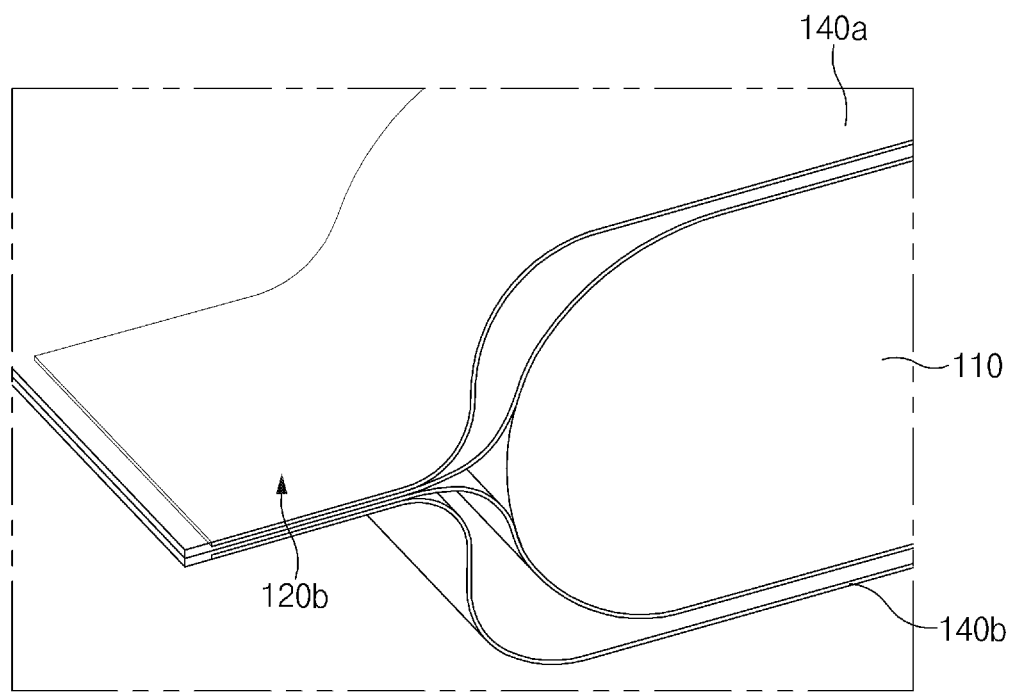
FIG. 5 is a view illustrating the exterior material and the cover member combined with each other.

FIG. 4 is a view illustrating the electrode assembly 110 accommodated in the exterior material 140 according to an embodiment. FIG. 5 is a view illustrating the exterior material 140 and the cover member 120b combined with each other. FIG. 5 is a sectional perspective view taken along line B-B' of FIG. 4, where FIG. 5 illustrates a coupling structure of the exterior material 140 and the cover member 120b.

Referring to FIGS. 4 and 5, a battery 100 according to an embodiment may include the exterior material 140 that accommodates the electrode assembly 110 and the at least one cover member 120a and/or 120b described above. In an embodiment, the exterior material 140 may include a pouch type (two halves sealed together at the edges, forming an interior space or "pouch") exterior material 140 having a plurality of film sheets and metal sheets laminated one above another. The film sheets may include, for example, an insulating resin (e.g., polypropylene, nylon, or the like), and the metal sheets may include, for example, an aluminum sheet. Although the exterior material 140 of a pouch type is illustrated in FIGS. 4 and 5, the battery 100 according to the embodiment may include an exterior material in the shape of a prism, a cylinder, or a coin, other than the pouch type exterior material.

Figure 6:
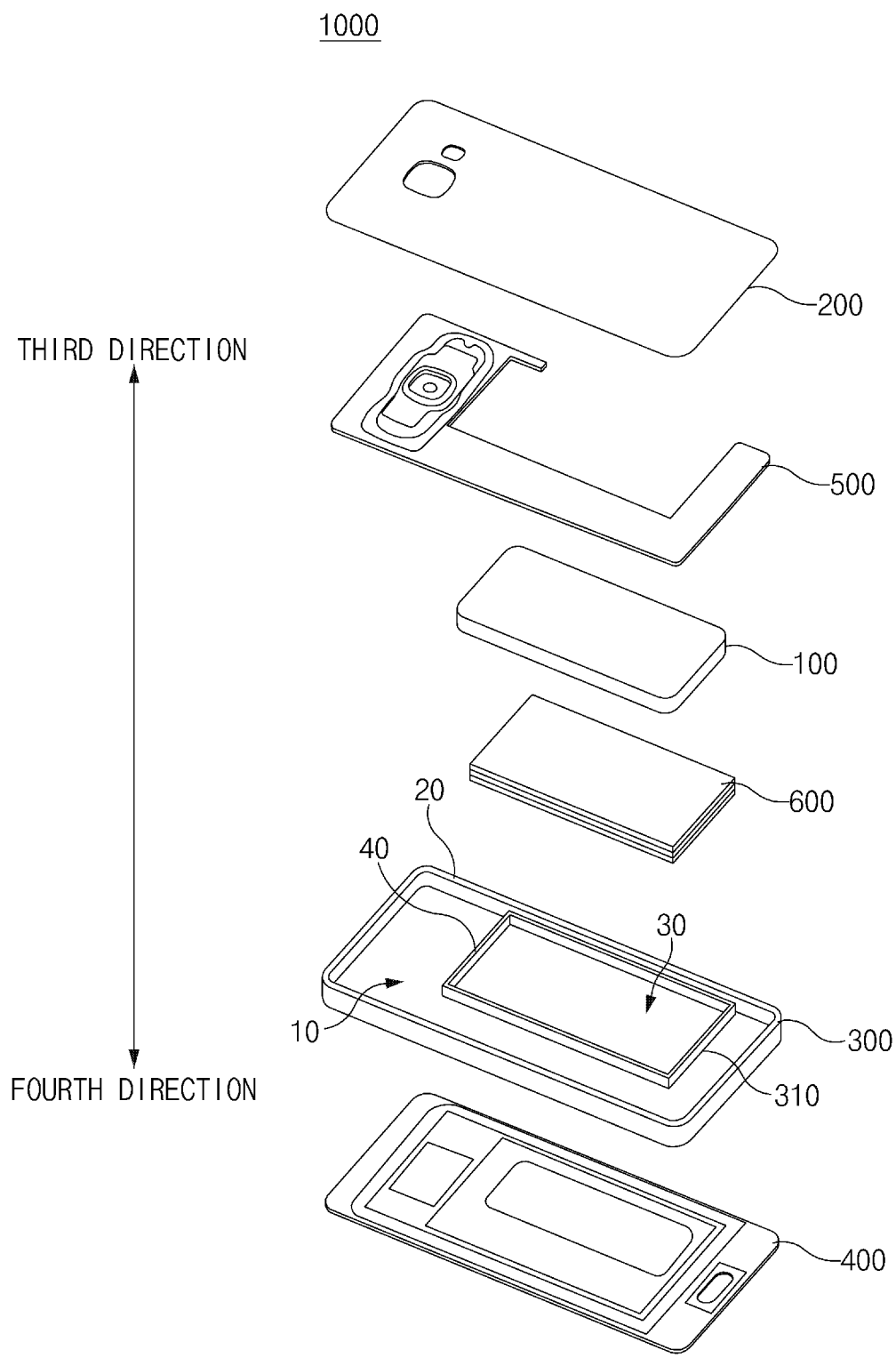
FIG. 6 is an exploded perspective view illustrating an electronic device according to an embodiment.

In an embodiment, the exterior material 140 may include a first laminated structure 140a disposed above the electrode assembly 110 and a second laminated structure 140b disposed below the electrode assembly 110. The first and second laminated structures 140a and 140b may be bonded by a thermal-curing or photo-curing process (e.g., a curing process at a temperature of 180° C. and a pressure of 0.8 MPa for 3.0 sec) to seal the inner space in which the electrode assembly 110 and the at least one cover member 120a and/or 120b are accommodated. According to an embodiment, in the thermal-curing or photo-curing process, at least part of the cover member 120a and/or 120b (e.g., a side region of the cover member 120a and/or 120b in the direction B-B') may overlap at least part of the facing regions (e.g., the edge regions) of the first and second laminated structures 140a and 140b. Accordingly, the cover member 120a and/or 120b may be fixed to the exterior material 140 by the region of the cover member 120a and/or 120b that is interposed and cured between the first and second laminated structures 140a and 140b, and therefore relative motion of the exterior material 140 and the cover member 120a and/or 120b may be suppressed. FIG. 6 is an exploded perspective view illustrating an electronic device 1000 according to an embodiment.

Referring to FIG. 6, the electronic device 1000 according to the embodiment may include a first case 200 (e.g., a rear case), a second case 300 (e.g., a front case), a display 400, a printed circuit board 500, and the battery 100. In various embodiments, the electronic device 1000 may not include at least one of the components mentioned above, or may further include other component(s). For example, the electronic device 1000 may further include at least one system resource (e.g., a processor and/or a memory) that supports operation of a function (e.g., contents output) of the display 400 or is powered by the battery 100.

The first case 200 and the second case 300 may be combined together to form a housing for accommodating the components of the electronic device 1000. In this regard, at least one protruding member may be formed on at least a partial area (e.g., an edge area) of any one of the first and second cases 200 and 300, and at least one receiving member corresponding to the shape of the protruding member may be formed on at least a partial area (e.g., an edge area) of the other case. The protruding member may be fit into the receiving member by external pressure. Accordingly, the first case 200 and the second case 300 may be integrally coupled to each other.

In an embodiment, the second case 300 may include a first surface 10 and one or more second surfaces 20 extending from the edge of the first surface 10 at a specified angle (e.g., substantially 90 degrees) in third and fourth directions. In various embodiments, the one or more second surfaces 20 may be separately formed and then fastened (or coupled) with each other, or may be integrally formed with each other. The second case 300 may include a first internal space that is open in the third direction and a second internal space that is open in the fourth direction, depending on the structural shape by the first surface 10 and the second surfaces 20.

In an embodiment, the second case 300 may include, in a region of the first internal space, a frame structure 310 for accommodating the battery 100. The frame structure 310 may be formed through a separate process and then coupled (or bonded) to the second case 300, or may be formed as part of the second case 300 in the manufacturing process (e.g., injection molding) of the second case 300. In an embodiment, the frame structure 310 may include a first surface 30 (e.g., a base or a surface on which the battery 100 is placed) and one or more second surfaces 40 (e.g., side surfaces or surfaces by which the battery 100 is fixed) that extend from the edge of the first surface 30 at a specified angle (e.g., substantially 90 degrees). In various embodiments, the second surfaces 40 of the frame structure 310 may extend from the first surface 30 to the height that is equal or similar to the thickness of the battery 100.

The display 400 may be disposed in the second internal space of the second case 300. For example, part of the display 400 may be inserted into the second internal space, and the remaining part of the display 400 may be exposed to the outside and may be coupled (or bonded) to the distal ends of the second surfaces 40 of the second case 300, which form the second internal space, to finish the open second internal space.

In an embodiment, the display 400 may include a touch screen display. In this regard, the display 400 may include a display panel, a cover glass, and a touch panel (or a touch sensor). The display panel may output at least one user interface or contents (e.g., text, an image, a video, an icon, a widget, a symbol, or the like) in response to a user input or preset scheduling information. The cover glass may be disposed above the display panel and may transmit light emitted from the display panel. A user input (e.g., a touch, a drag, a press, or the like) by a user's body (e.g., a finger) or an electronic pen may be applied to at least a partial area of the cover glass. The touch panel may receive a signal according to the user input and may output an electrical signal corresponding thereto (e.g., a capacitive type, a pressure sensitive type, an infrared type, or an ultrasonic type).

At least one component related to operation of a function of the electronic device 1000 may be mounted on the printed circuit board 500. For example, a memory, a processor, an antenna module, a speaker module, or a conductive circuit related to the components may be mounted on the printed circuit board 500. In an embodiment, the printed circuit board 500 may be formed in a shape avoiding the frame structure 310 so as not to overlap at least a partial area of the battery 100 accommodated in the frame structure 310. In various embodiments, a plurality of printed circuit boards 500 may be provided, and at least some of the plurality of printed circuit boards 500 may be electrically connected together and may be laminated one above another.

The battery 100 may be understood as a battery that includes the electrode assembly, the cover member, and the exterior material that have been described above with reference to FIGS. 1 to 5. In an embodiment, the battery 100 may be fixed in the frame structure 310 by an adhesive member 600 (e.g., a tape) with an area the same as or corresponding to that of the battery 100. The battery 100 may be electrically connected to the components of the electronic device 1000 to supply drive power thereto. In various embodiments, a protection circuit module (PCM) may be connected to a region of the battery 100. The protection circuit module may prevent over-charge or over-discharge of the battery 100. In this regard, an over-charge protection voltage value or an over-discharge protection voltage value may be set for the protection circuit module. In various embodiments, the battery 100 may include a lithium ion battery or a lithium ion polymer battery.

Figure 7:
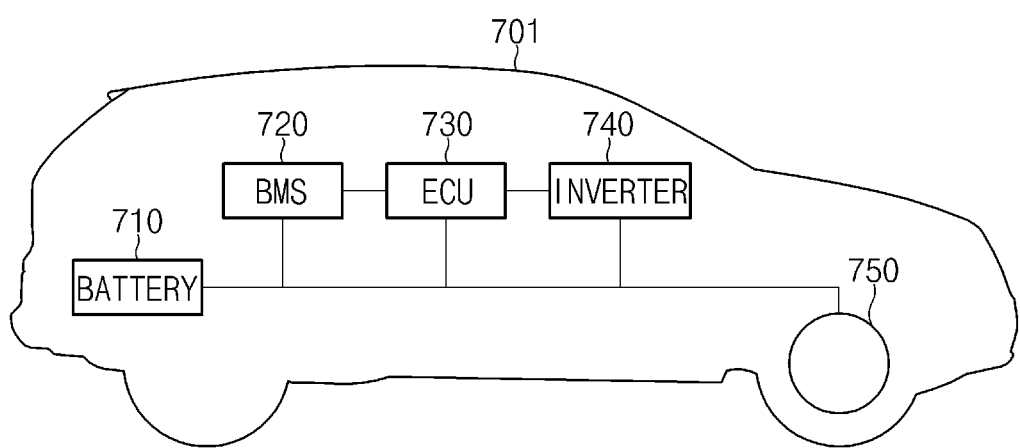
FIG. 7 is a view illustrating an electric vehicle to which a battery according to an embodiment is applicable.

FIG. 7 is a view illustrating an electric vehicle to which a battery according to an embodiment is applicable.

According to an embodiment, the battery described above with reference to FIGS. 1 to 5 may be applied to various aspects of electric vehicles (e.g., a battery electric vehicle, a hybrid electric vehicle, a plug-in hybrid electric vehicle, or the like), in addition to the electronic device 1000 (see FIG. 6).

Referring to FIG. 7 in relation to the above description, an electric vehicle 701 may include a battery 710, a battery management system (BMS) 720, an electric control unit (ECU) 730, an inverter 740, and a motor 750.

The battery 710 may include the electrode assembly 110 (see FIG. 4), the at least one cover member 120a and/or 120b (see FIG. 4), and the exterior material 140 (see FIG. 4) that have been described above. In an embodiment, the battery 710 may supply power to the motor 750 to drive the electric vehicle 701 and may be charged or discharged by the inverter 740 according to operation of the motor 750 or an internal combustion engine (not illustrated).

The BMS 720 may estimate status information such as the state of charging, the state of health, the maximum allowable input/output power, or the output voltage of the battery 710 and may control over-charge or over-discharge of the battery 710 using the status information.

The ECU 730 may be an electronic control device that controls the state of the electric vehicle 701. The ECU 730 may determine torque based on vehicle information such as an accelerator, a brake, or speed and may control the motor 750 such that the output of the motor 750 corresponds to the torque information.

The inverter 740 may receive a charge or discharge control signal of the battery 710 from the ECU 730 and may control the battery 710. The motor 750 may drive the electric vehicle 701, based on power (e.g., electrical energy) supplied from the battery 710 or control information transferred from the ECU 730.

In various embodiments, the battery 710 may supply power to another component mounted in the electric vehicle 701. For example, the battery 710 may supply power to a central information display for displaying various types of contents related to driving of the electric vehicle 701, a navigation system, a cluster, or the like. Furthermore, the battery 710 may supply power to a communication module that supports communication between the electric vehicle 701 and an external device or an external server, or a sensor module that performs various sensing operations on the inside or the outside of the electric vehicle 701.

A battery according to various embodiments may include an electrode assembly including a positive electrode sheet, a separation membrane, and a negative electrode sheet, at least one cover member surrounding at least a part of an outermost region of the electrode assembly, and exterior material accommodating the electrode assembly and the at least one cover member. According to various embodiments, at least one cover member has at least a partial area that overlaps and is fixed to the exterior material, and includes a plurality of air gaps permitting impregnation of the electrode assembly by an electrolyte.

According to various embodiments, the at least one cover member may include a plurality of air gaps that support impregnation of an electrolyte into the electrode assembly.

According to various embodiments, the at least one cover member may be formed to surround at least one of a distal end of the electrode assembly in a first direction or a distal end of the electrode assembly in a second direction.

According to various embodiments, the plurality of air gaps may include a regular or irregular pattern.

According to various embodiments, the battery may further include at least one electrode tab protruding from the electrode assembly.

According to various embodiments, the plurality of air gaps may be formed in a region corresponding to a protruding region of the electrode tab.

According to various embodiments, the plurality of air gaps may be formed to avoid the protruding region of the electrode tab.

According to various embodiments, the at least one cover member may include polypropylene.

According to various embodiments, the electrode assembly may include a jelly-roll type electrode assembly in which the positive electrode sheet, the separation membrane, and the negative electrode sheet laminated one above another are spirally wound.

According to various embodiments, the exterior material may include a pouch type exterior material having a plurality of film sheets and metal sheets laminated one above another.

According to various embodiments, the exterior material may include a first laminated structure disposed above the electrode assembly and a second laminated structure disposed below the electrode assembly.

According to various embodiments, the at least a partial area of the at least one cover member may overlap at least part of facing regions of the first laminated structure and the second laminated structure.

According to various embodiments, the at least a partial area of the at least one cover member may be cured with the first laminated structure and the second laminated structure and may be fixed to the exterior material.

An electronic device according to various embodiments may include a housing, a display accommodated in the housing and having at least part exposed outside the housing, a memory accommodated in the housing, a battery accommodated in the housing, and a processor electrically connected to the display, the memory, and the battery.

According to various embodiments, the battery included in the electronic device may include an electrode assembly include an electrode assembly including a positive electrode sheet, a separation membrane, and a negative electrode sheet, at least one cover member surrounding at least a part of an outermost region of the electrode assembly, and exterior material accommodating the electrode assembly and the at least one cover member. According to various embodiments, the at least one cover member has at least a partial area that overlaps and is fixed to the exterior material, and includes a plurality of air gaps permitting impregnation of the electrode assembly by an electrolyte.

According to various embodiments, the at least one cover member of the battery included in the electronic device may include a plurality of air gaps that support impregnation of an electrolyte into the electrode assembly.

According to various embodiments, the at least one cover member of the battery included in the electronic device may be formed to surround at least one of a distal end of the electrode assembly in a first direction or a distal end of the electrode assembly in a second direction.

According to various embodiments, the battery included in the electronic device may further include at least one electrode tab protruding from the electrode assembly.

According to various embodiments, the plurality of air gaps of the battery included in the electronic device may be formed in a region corresponding to a protruding region of the electrode tab.

According to various embodiments, the exterior material of the battery included in the electronic device may include a first laminated structure disposed above the electrode assembly and a second laminated structure disposed below the electrode assembly, According to various embodiments, the at least a partial area of the at least one cover member of the battery included in the electronic device may overlap at least part of facing regions of the first laminated structure and the second laminated structure.

Figure 8:
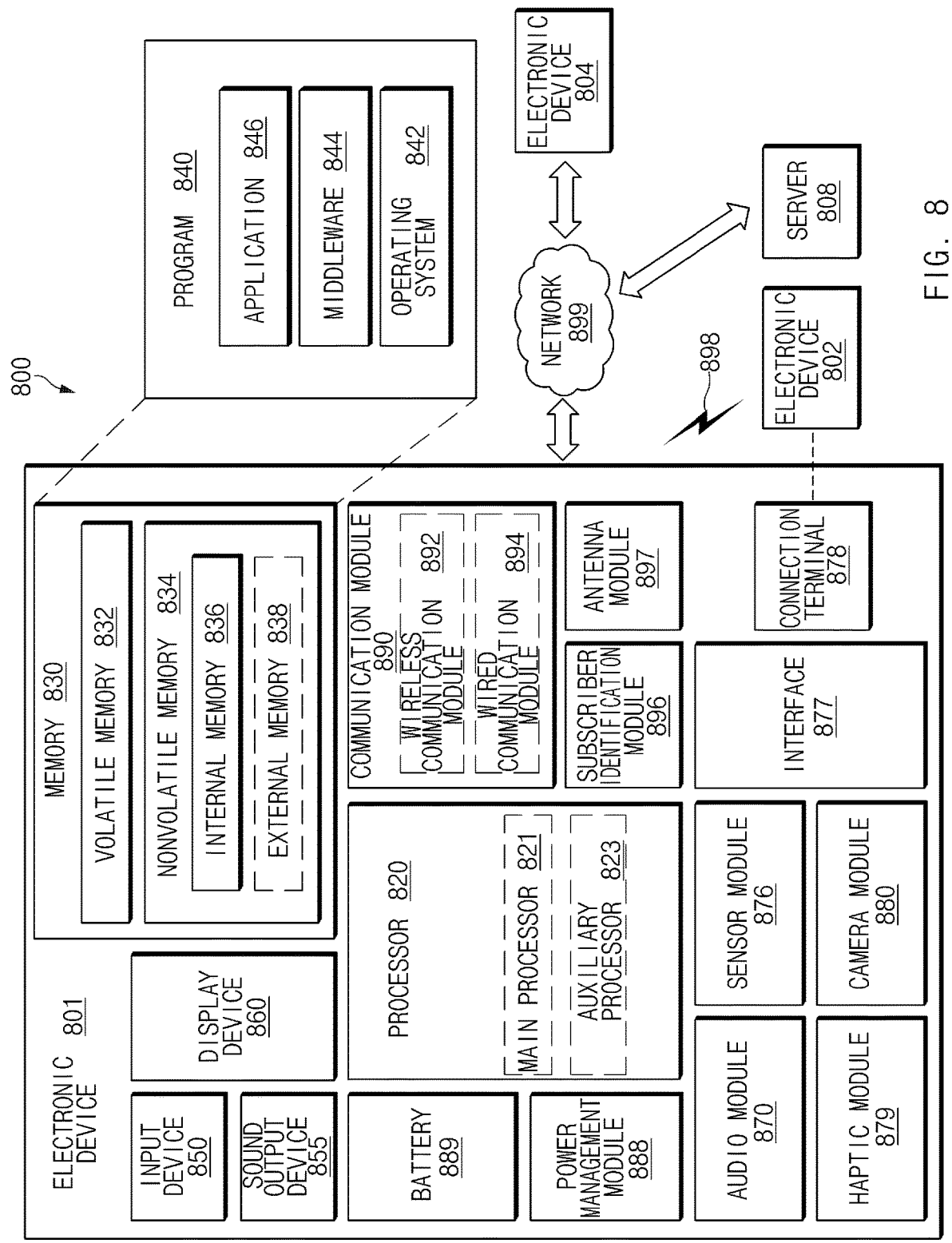
FIG. 8 is a view illustrating an electronic device in a network environment according to an embodiment.

FIG. 8 is a block diagram of an electronic device in a network environment according to an embodiment.

Referring to FIG. 8, an electronic device 801 may communicate with an electronic device 802 through a first network 898 (e.g., a short-range wireless communication) or may communicate with an electronic device 804 or a server 808 through a second network 899 (e.g., a long-distance wireless communication) in a network environment 800. According to an embodiment, the electronic device 801 may communicate with the electronic device 804 through the server 808. According to an embodiment, the electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module 896, and an antenna module 897. According to some embodiments, at least one (e.g., the display device 860 or the camera module 880) among components of the electronic device 801 may be omitted or other components may be added to the electronic device 801. According to some embodiments, some components may be integrated and implemented as in the case of the sensor module 876 (e.g., a fingerprint sensor, an iris sensor, or an illuminance sensor) embedded in the display device 860 (e.g., a display).

The processor 820 may operate, for example, software (e.g., a program 840) to control at least one of other components (e.g., a hardware or software component) of the electronic device 801 connected to the processor 820 and may process and compute a variety of data. The processor 820 may load a command set or data, which is received from other components (e.g., the sensor module 876 or the communication module 890), into a volatile memory 832, may process the loaded command or data, and may store result data into a nonvolatile memory 834. According to an embodiment, the processor 820 may include a main processor 821 (e.g., a central processing unit or an application processor) and an auxiliary processor 823 (e.g., a graphic processing device, an image signal processor, a sensor hub processor, or a communication processor), which operates independently from the main processor 821, additionally or alternatively uses less power than the main processor 821, or is specified to a designated function. In this case, the auxiliary processor 823 may operate separately from the main processor 821 or embedded.

In this case, the auxiliary processor 823 may control, for example, at least some of functions or states associated with at least one component (e.g., the display device 860, the sensor module 876, or the communication module 890) among the components of the electronic device 801 instead of the main processor 821 while the main processor 821 is in an inactive (e.g., sleep) state or together with the main processor 821 while the main processor 821 is in an active (e.g., an application execution) state. According to an embodiment, the auxiliary processor 823 (e.g., the image signal processor or the communication processor) may be implemented as a part of another component (e.g., the camera module 880 or the communication module 890) that is functionally related to the auxiliary processor 823. The memory 830 may store a variety of data used by at least one component (e.g., the processor 820 or the sensor module 876) of the electronic device 801, for example, software (e.g., the program 840) and input data or output data with respect to commands associated with the software. The memory 830 may include the volatile memory 832 or the nonvolatile memory 834.

The program 840 may be stored in the memory 830 as software and may include, for example, an operating system 842, a middleware 844, or an application 846.

The input device 850 may be a device for receiving a command or data, which is used for a component (e.g., the processor 820) of the electronic device 801, from an outside (e.g., a user) of the electronic device 801 and may include, for example, a microphone, a mouse, or a keyboard.

The sound output device 855 may be a device for outputting a sound signal to the outside of the electronic device 801 and may include, for example, a speaker used for general purposes, such as multimedia play or recordings play, and a receiver used only for receiving calls. According to an embodiment, the receiver and the speaker may be either integrally or separately implemented.

The display device 860 may be a device for visually presenting information to the user and may include, for example, a display, a hologram device, or a projector and a control circuit for controlling a corresponding device. According to an embodiment, the display device 860 may include a touch circuitry or a pressure sensor for measuring an intensity of pressure on the touch.

The audio module 870 may convert a sound and an electrical signal in dual directions. According to an embodiment, the audio module 870 may obtain the sound through the input device 850 or may output the sound through an external electronic device (e.g., the electronic device 802 (e.g., a speaker or a headphone)) wired or wirelessly connected to the sound output device 855 or the electronic device 801.

The sensor module 876 may generate an electrical signal or a data value corresponding to an operating state (e.g., power or temperature) inside or an environmental state outside the electronic device 801. The sensor module 876 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 877 may support a designated protocol wired or wirelessly connected to the external electronic device (e.g., the electronic device 802). According to an embodiment, the interface 877 may include, for example, an HDMI (high-definition multimedia interface), a USB (universal serial bus) interface, an SD card interface, or an audio interface.

A connecting terminal 878 may include a connector that physically connects the electronic device 801 to the external electronic device (e.g., the electronic device 802), for example, an HDMI connector, a USB connector, an SD card connector, or an audio connector (e.g., a headphone connector).

The haptic module 879 may convert an electrical signal to a mechanical stimulation (e.g., vibration or movement) or an electrical stimulation perceived by the user through tactile or kinesthetic sensations. The haptic module 879 may include, for example, a motor, a piezoelectric element, or an electric stimulator.

The camera module 880 may shoot a still image or a video image. According to an embodiment, the camera module 880 may include, for example, at least one lens, an image sensor, an image signal processor, or a flash.

The power management module 888 may be a module for managing power supplied to the electronic device 801 and may serve as at least a part of a power management integrated circuit (PMIC).

The battery 889 may be a device for supplying power to at least one component of the electronic device 801 and may include, for example, a non-rechargeable (primary) battery, a rechargeable (secondary) battery, or a fuel cell.

The communication module 890 may establish a wired or wireless communication channel between the electronic device 801 and the external electronic device (e.g., the electronic device 802, the electronic device 804, or the server 808) and support communication execution through the established communication channel. The communication module 890 may include at least one communication processor operating independently from the processor 820 (e.g., the application processor) and supporting the wired communication or the wireless communication. According to an embodiment, the communication module 890 may include a wireless communication module 892 (e.g., a cellular communication module, a short-range wireless communication module, or a GNSS (global navigation satellite system) communication module) or a wired communication module 894 (e.g., an LAN (local area network) communication module or a power line communication module) and may communicate with the external electronic device using a corresponding communication module among them through the first network 898 (e.g., the short-range communication network such as a Bluetooth, a Wi-Fi direct, or an IrDA (infrared data association)) or the second network 899 (e.g., the long-distance wireless communication network such as a cellular network, an internet, or a computer network (e.g., LAN or WAN)). The above-mentioned various communication modules 890 may be implemented into one chip or into separate chips, respectively.

According to an embodiment, the wireless communication module 892 may identify and authenticate the electronic device 801 using user information stored in the subscriber identification module 896 in the communication network.

The antenna module 897 may include one or more antennas to transmit or receive the signal or power to or from an external source. According to an embodiment, the communication module 890 (e.g., the wireless communication module 892) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 801 and the external electronic device 804 through the server 808 connected to the second network 899. Each of the electronic devices 802 and 804 may be the same or different types as or from the electronic device 801. According to an embodiment, all or some of the operations performed by the electronic device 801 may be performed by another electronic device or a plurality of external electronic devices. When the electronic device 801 performs some functions or services automatically or by request, the electronic device 801 may request the external electronic device to perform at least some of the functions related to the functions or services, in addition to or instead of performing the functions or services by itself. The external electronic device receiving the request may carry out the requested function or the additional function and transmit the result to the electronic device 801. The electronic device 801 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 840) including an instruction stored in a machine-readable storage media (e.g., an internal memory 836 or an external memory 838) readable by a machine (e.g., a computer). The machine may be a device that calls the instruction from the machine-readable storage media and operates depending on the called instruction and may include the electronic device (e.g., the electronic device 801). When the instruction is executed by the processor (e.g., the processor 820), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A battery comprising:
   an electrode assembly including a positive electrode sheet, a separation membrane, and a negative electrode sheet, spirally wound about at least one axis forming a jelly roll;
   a top cover member surrounding a first portion of a length of the jelly roll;
   a bottom cover member surrounding a second portion of a length of the jelly roll; and
   an exterior material accommodating the electrode assembly and the at least one cover member,
   wherein the top cover member and the bottom cover member have at least a partial area that overlaps and is fixed to the exterior material, and includes a plurality of air gaps permitting impregnation of the electrode assembly by an electrolyte.

2. The battery of claim 1, wherein the top cover member is formed to surround a distal end of the electrode assembly in a first direction, and the bottom cover member is formed to surround a distal end of the electrode assembly in a second direction.

3. The battery of claim 1, wherein the plurality of air gaps include a regular pattern.

4. The battery of claim 1, further comprising:
   at least one electrode tab protruding from the electrode assembly,
   wherein the plurality of air gaps are formed in a region corresponding to a protruding region of the electrode tab.

5. The battery of claim 4, wherein the plurality of air gaps avoid the protruding region of the electrode tab.

6. The battery of claim 1, wherein the top cover member and the bottom cover member comprises polypropylene.

7. The battery of claim 1, wherein the top cover member and the bottom cover member are aligned with the at least one axis.

8. The battery of claim 1, wherein the exterior material includes a pouch type exterior material having a plurality of film sheets and metal sheets laminated one above another.

9. The battery of claim 1, wherein the exterior material includes a first laminated structure disposed above the electrode assembly and a second laminated structure disposed below the electrode assembly.

10. The battery of claim 9, wherein the top cover member and the bottom cover member overlaps at least part of the first laminated structure and the second laminated structure.

11. The battery of claim 9, wherein the top cover member and the bottom cover member are cured with the first laminated structure and the second laminated structure and fixed to the exterior material.

12. The battery of claim 1, wherein the plurality of air gaps include an irregular pattern.

13. An electronic device comprising:
   a housing;
   a display accommodated in the housing, at least part of the display being exposed outside the housing;
   a memory disposed in the housing;
   a battery accommodated in the housing; and
   a processor electrically connected to the display, the memory, and the battery,
   wherein the battery includes:
   an electrode assembly including a positive electrode sheet, a separation membrane, and a negative electrode sheet, spirally wound about at least one axis forming a jelly roll;
   a top cover member surrounding a first portion of a length of the jelly roll;

a bottom cover member surrounding a second portion of a length of the jelly roll; and an exterior material accommodating the electrode assembly and the at least one cover member, and wherein the top cover member and the bottom cover member have at least a partial area that overlaps the exterior material and that is fixed to the exterior material, and includes a plurality of air gaps that support impregnation of the electrode assembly by an electrolyte.

14. The electronic device of claim 13, wherein the top cover member surrounds a distal end of the electrode assembly in a first direction, and the bottom cover member surrounds a distal end of the electrode assembly in a second direction.

15. The electronic device of claim 13, wherein the battery further includes at least one electrode tab protruding from the electrode assembly, and wherein the plurality of air gaps are formed in a region corresponding to a protruding region of the electrode tab.

16. The electronic device of claim 13, wherein the exterior material includes a first laminated structure disposed above the electrode assembly and a second laminated structure disposed below the electrode assembly, and wherein the at least a partial area of the top cover member and the bottom cover member overlaps at least part of facing regions of the first laminated structure and the second laminated structure.

17. The battery of claim 1, wherein the top cover member and the bottom cover member permit another portion of the length of jelly roll, different from the first portion and the second portion of the length of the jelly roll, to increase in size.

18. The electronic device of claim 13, wherein the top cover member and the bottom cover member permit another portion of the length of jelly roll, different from the first portion and the second portion of the length of the jelly roll, to increase in size.

* * * * *